Figure 1:
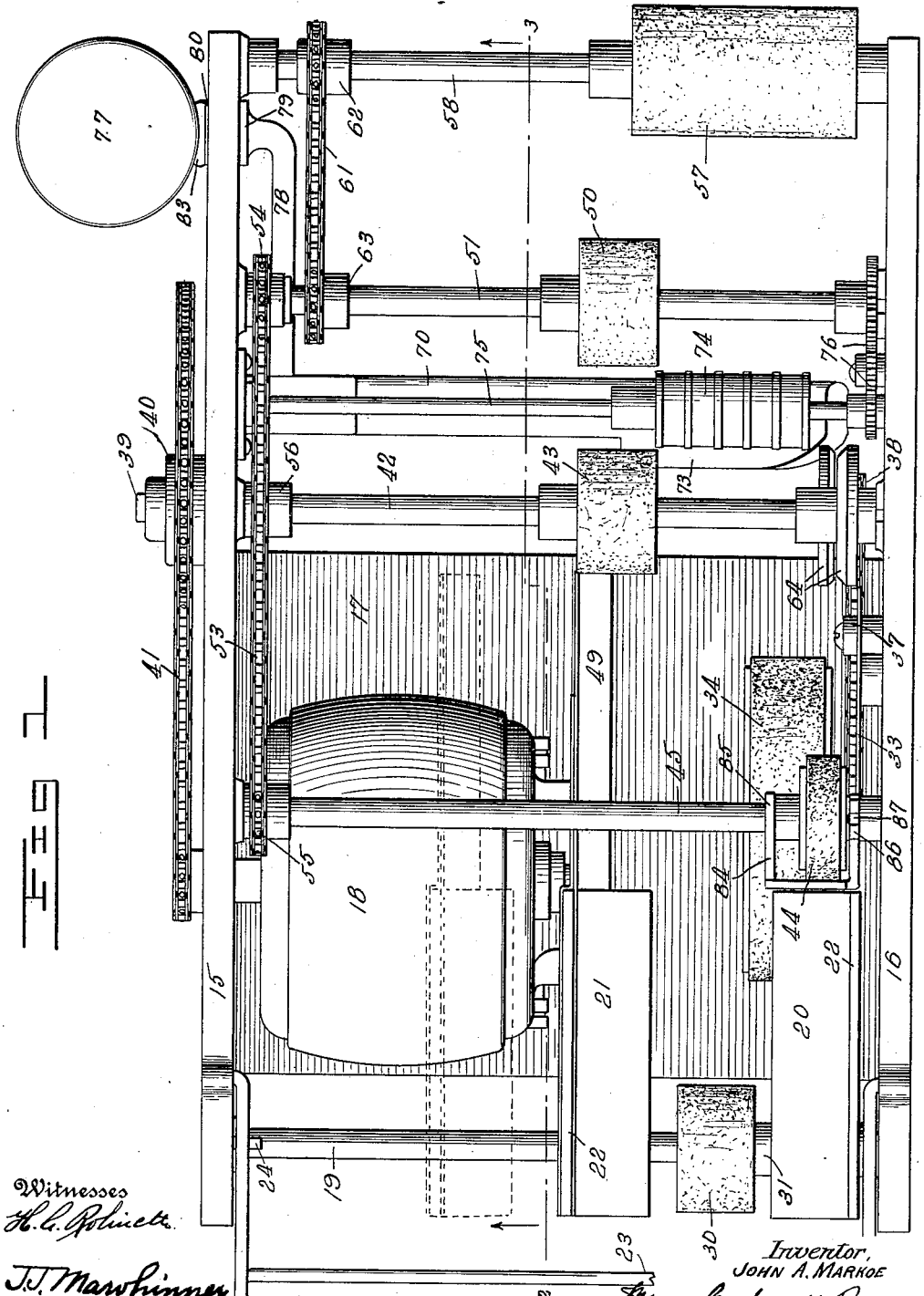

J. A. MARKOE.
ENVELOP SEALING MACHINE.
APPLICATION FILED SEPT. 4, 1912.

1,096,309.

Patented May 12, 1914.
6 SHEETS—SHEET 1.

Witnesses
H. C. Robinette
J. J. Mawhinney

Inventor,
JOHN A. MARKOE
Meyers, Cushman & Rea
Attys.

J. A. MARKOE.
ENVELOP SEALING MACHINE.
APPLICATION FILED SEPT. 4, 1912.

1,096,309.

Patented May 12, 1914.
6 SHEETS—SHEET 4.

J. A. MARKOE.
ENVELOP SEALING MACHINE.
APPLICATION FILED SEPT. 4, 1912.

1,096,309.

Patented May 12, 1914.
6 SHEETS—SHEET 5.

Witnesses
H. G. Robrietz
J. T. Mawhinney

Inventor
John A. Markoe

By Lyon, Lyon ... 
Attorneys.

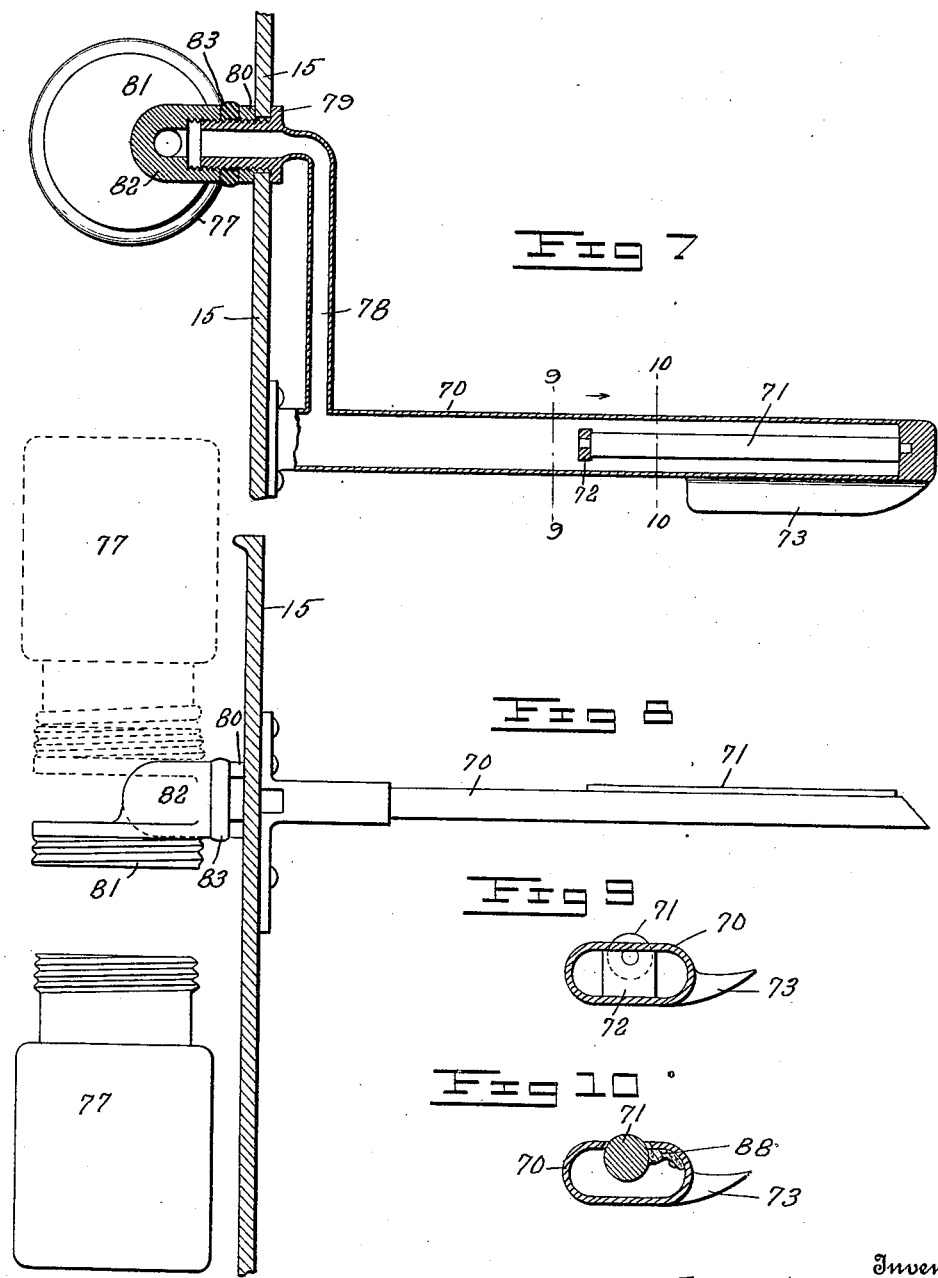

UNITED STATES PATENT OFFICE.

JOHN A. MARKOE, OF ST. PAUL, MINNESOTA, ASSIGNOR TO ELECTRIC MAILING MACHINE COMPANY, A CORPORATION OF MINNESOTA.

ENVELOP-SEALING MACHINE.

1,096,309.

Specification of Letters Patent.

Patented May 12, 1914.

Application filed September 4, 1912. Serial No. 718,533.

*To all whom it may concern:*

Be it known that I, JOHN A. MARKOE, a citizen of the United States, residing at St. Paul, in the county of Ramsey and State of Minnesota, have invented new and useful Improvements in Envelop-Sealing Machines, of which the following is a specification.

This invention relates to envelop, packet, or sealing machines of a like nature, and has special reference to improvements in the structure of sealing machines of the rotary type. These improvements embrace, broadly, devices or parts which draw in the envelops, or other articles to be sealed, mechanically and positively raise the flaps of the envelops, press the gummed faces of the flaps against a moistening part to insure the softening of the gum, and finally press the gummed flaps to the envelops to insure the sealing of the flaps.

This invention has various other objects and advantages, of more or less importance, which will be brought out more clearly in the following detail description of the present embodiment of this invention such as is illustrated in the accompanying drawings. These objects and advantages relate more particularly to the details of the construction of this machine, but are found to be essential in the combination for effecting the correct and automatic handling of the envelops. Among these objects may here be mentioned the following: to provide adjustable bearings for the various roller shafts of the sealer whereby to effect a yielding pressure against the flaps and envelops being sealed, and to produce an automatically adjustable machine capable of handling envelops varying, to a limited extent, in size and thickness; to provide means for twisting over the flap edge of the envelop for raising the free edge of the flap from the envelop; to provide adjustable means for straightening out the envelop prior to pressing the flap against the envelop so that the sealed envelop will lie flat and may be easily handled by the stamping, stacking, or other mechanism desired; and, to provide particular devices for feeding the envelops through the mechanism which will hold and carry the envelops in such position as to insure the positive operation of the sealing devices.

Figure 2:
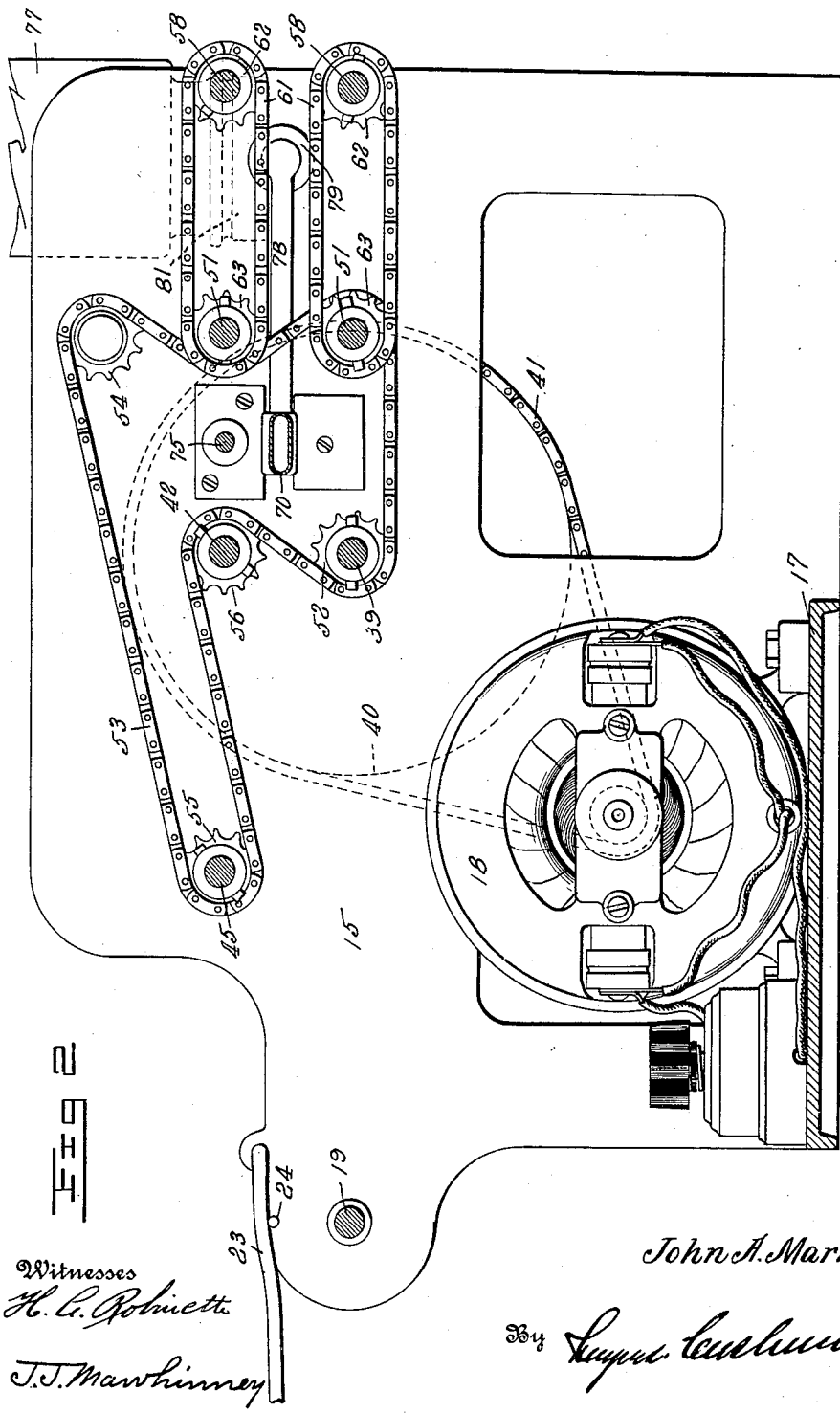
Figure 3:
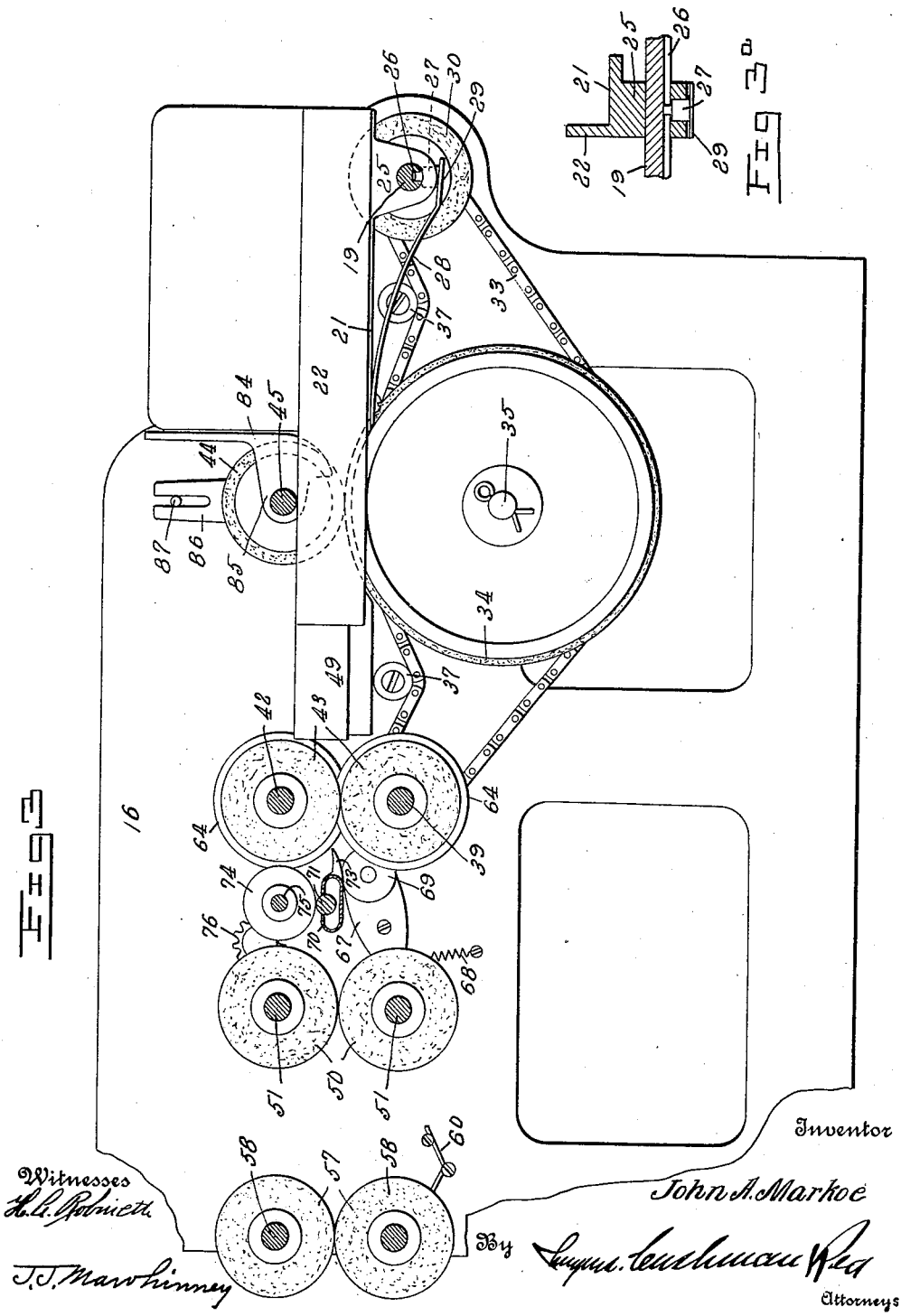
Figure 4:
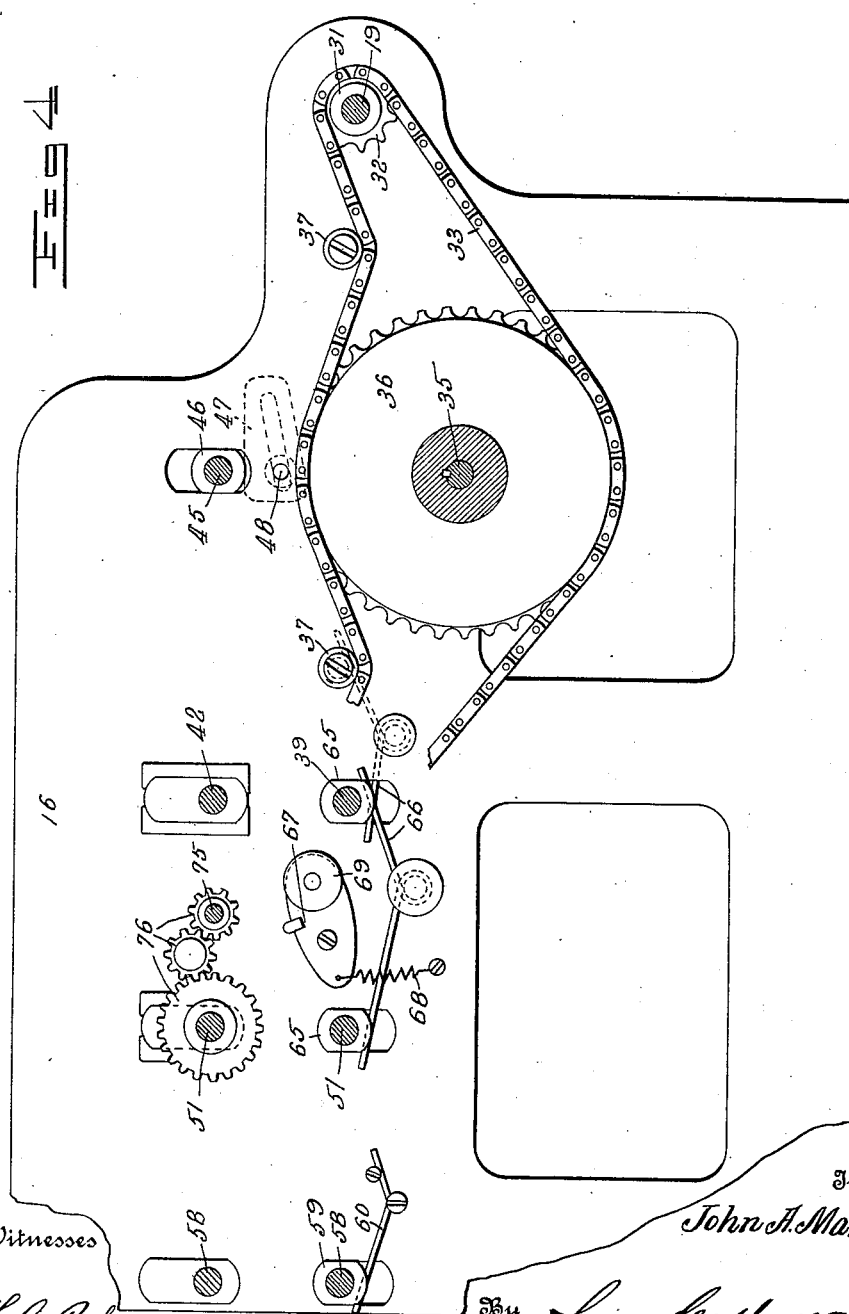
Figure 5:
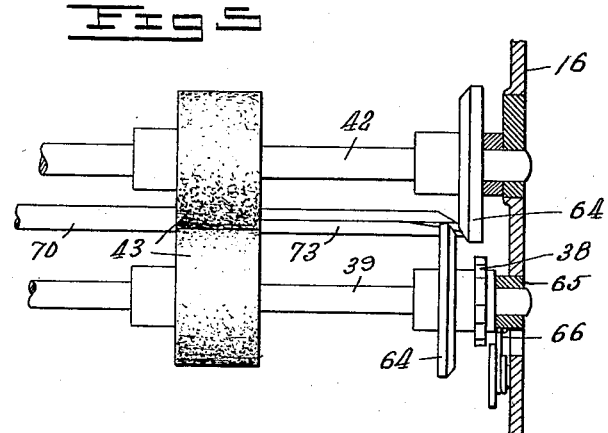
Figure 6:
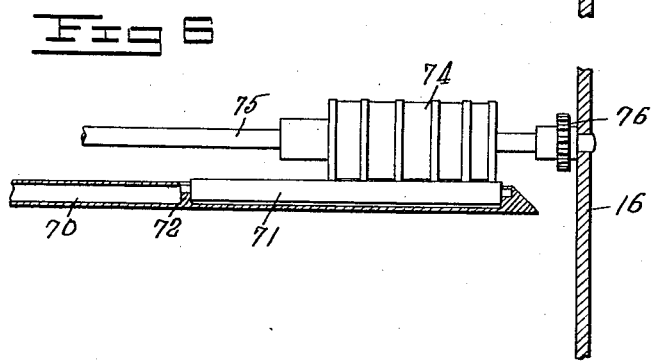
Figure 11:
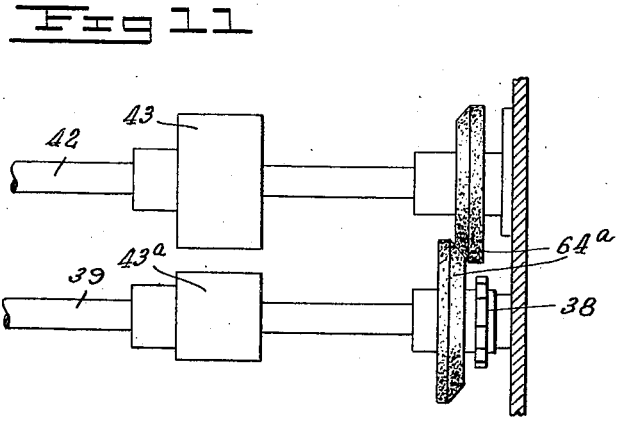

In the drawings: Figure 1 is a top plan view of a sealer constructed in accordance with this invention. Fig. 2 is a longitudinal central section of the sealer taken on the line 2—3 of Fig. 1 looking in the direction of the arrows and showing the operating mechanism. Fig. 3 is a longitudinal section of the machine taken on the line 3—2 of Fig. 1 looking in the direction opposite to Fig. 2 and showing the sealing mechanism. Fig. 3ª is a detail sectional view on the line *a—a* of Fig. 3, showing the locking device for the adjustable envelop support. Fig. 4 is a longitudinal section of the machine taken along the side of the frame opposite to the motor, looking toward such side and showing the mountings in the frame for the several parts of the machine. Fig. 5 is a detail view, partly in section, of the packet warping or bending rollers and their adjacent parts. Fig. 6 is a detail view, in elevation and partly in section, of the moistening device. Fig. 7 is a horizontal sectional view of the moistener trough and the fluid feeding device associated therewith. Fig. 8 is a view in elevation of the same, showing in full lines the fluid receptacle detached for filling, cleansing, or the like, and in dotted lines the receptacle in working position. Fig. 9 is a transverse section through the trough on the line 9—9 of Fig. 7. Fig. 10 is a similar view taken on the line 10—10 of Fig. 7. Fig. 11 is a view similar to Fig. 5, but showing a slight modification in the warping or bending mechanism.

Referring to the drawings, in which like parts are designated by similar characters of reference throughout the several views, 15 and 16 designate the sides of the frame of the machine carrying a base 17 upon which is suitably mounted an electric or other suitable motor 18 for driving the machine. The base or platform 17 is preferably arranged as shown in the lower part of the frame at its forward end. The sides 15 and 16 of the frame may be braced in any suitable manner by the several shafts employed, and by a transverse rod 19 at the forward end of the frame. Mounted upon the rod 19 is an envelop receiving table, the same comprising a pair of horizontal plates 20 and 21 each having an upstanding side or flange 22 at its outer edge forming with the horizontal portions of the plates 20 and 21 an inclosed table or receptacle for receiving the envelops. The plate 20 is fixed upon the rod 19 adjacent the side 16 and in line with the sealing mechanism hereinafter described, while the plate 21 is adjustable upon the rod 19 so as to move laterally in the frame and vary the distance between the two plates 20 and 21. This adjustment is provided for the accommodation of packets varying in size. A bail 23 is suitably hinged upon the upper edge of the frame and extends across the forward end of the frame, and constitutes, when swung outwardly to rest upon the pins 24, an extension of the envelop receiving table. The pins 24 project inwardly from the sides 15 and 16 of the frame and support the sides of the bail 23 when extended. The adjustable plate 21 is mounted upon a bracket arm 25 depending from the plate and having an opening therethrough snugly receiving the rod 19. The rod 19 is provided in its underside with a longitudinal groove 26, into which projects a pin 27 loosely carried in the lower end of the bracket arm 25. The pin 27 is yieldingly held in the groove 26 by a leaf spring 28 carried against the underside of the plate 21, and bearing at its free end against the outer extremity of the pin 27. The spring 28 extends slightly beyond the pin 27 to provide a thumb-engaging lip 29 whereby the pin 27 may be relieved of the pressure of the spring 28 and fall out of the groove 26 whereby the plate 21 may be adjusted to the desired position.

An initial feeding roll 30 is mounted upon a sleeve 31 rotatable upon the rod 19, the feed roll 30 being located between the plates 20 and 21 and extending up to an appreciable distance between the plates. The envelops placed upon the plates 20 and 21 rest intermediate their ends upon the roll 30 and are carried thereby into the machine. The sleeve 31 is provided with a sprocket wheel 32 receiving thereover an endless chain 33 hereinafter referred to.

Forwardly of the envelop receiving table, and considerably below the plane of the same, is disposed the main feed roll 34 mounted upon a transverse shaft 35 journaled at its ends in the sides 15 and 16 of the frame. The main feed roll 34 is of relatively large diameter and projects up above the plane of the envelop receiving table into the plane of the initial feed roll 30. The main feed roll 34 receives the inner ends of the envelops and draws the same from the table into the machine. The shaft 35 carries upon one end and adjacent to the side 16 a large sprocket wheel 36 over which passes the endless chain 33. Tension rollers 37 are carried against the inner face of the side 16 and bear upon the chain 33 in order to hold the same taut out of contact with the edges of the envelops passing through the machine. These tension rollers 37 are preferably arranged as disclosed in Fig. 3, one at each side of the main feed roll 34. The chain 33 also passes over a small sprocket 38 mounted upon the end of the shaft 39 in line with the sprocket 36 whereby the shaft 39, the main feed roll 34 and the initial feed roll 30 move in unison. The shaft 39 extends transversely across the frame and constitutes the main drive shaft of the machine. The opposite end of the shaft 39 extends through the side 15 and carries against the outer face of the side 15 a large sprocket wheel 40 over which passes a drive chain 41 leading from the shaft of the motor 18. Immediately above the drive shaft 39 is a parallel shaft 42. The shafts 39 and 42 carry, toward their middle portions, a pair of contacting friction rollers 43 adapted to receive therebetween the envelops and to draw them from the main feeding roll and hold the envelops in line with the mechanism during the operation of the flap raising and moistening devices.

Immediately above the main feed roll 34 a separating roll 44 is located, the latter being mounted upon a rocking shaft 45 mounted at one end in a loose bearing in the side 15 and supported at its opposite end upon a vertically sliding bearing 46. The bearing 46 comprises a block slidable in a vertical slot in the side 16 adapted to rise and fall and accommodate the separating roll 44 to envelops varying in thickness. For the purpose of regulating the downward movement of the rocking shaft 45, a rest 47 of wedge form is used, and is slidably mounted against the outer face of the side 16 of the frame beneath the block 46. This rest 47 is in the form of a flat plate having its longitudinal edges converging toward one end and provided with a longitudinal slot in parallelism with one of the edges through which passes a binding screw threaded into the side 16. To adjust this form of rest it is only necessary to slide the plate longitudinally beneath the block 46 and to secure the rest in place by the screw 48. The upper edge of the rest 47 is thus raised or lowered so as to receive the block 46 when it drops after the envelop is passed from beneath the same. This provision is made so as to prevent the separating roll 44 from bearing upon the single packet passing over the main feed roll 34, thereby permitting the packet to move freely into the machine. The separating roll is adapted to bear upon the upper packets which are forced forwardly by the lower packets and to move the same back upon the supporting table.

The movable plate 21 is provided with a fixed guide 49 extending longitudinally from the inner end of the plate 21 and being slightly flanged at its outer edge to retain the envelops passing over the main feed roll 34 in alinement with the mechanism.

A second pair of feed rolls 50 are disposed inwardly of the feed rolls 43 in spaced relation to the latter and mounted upon the transverse shafts 51. The shafts 51 are journaled at their ends in the sides 15 and 16 of the frame and support the feed rolls 50 at their middle portions in line with the first pair of feed rolls 43. The main drive shaft 39 carries adjacent the side 15 a small sprocket wheel 52 over which passes an endless chain 53. The chain 53 extends from the main shaft 39 to a small sprocket upon the lower shaft 51, passes over the inner side of such sprocket and forwardly over a sprocket wheel on the upper shaft 51. The movement of the chain 53 thus turns the upper and lower shafts 51 in opposite directions. From the sprocket of the upper shaft 51 the chain 53 passes upwardly over an idler 54 and thence forwardly and downwardly in the machine to the sprocket 55 mounted on the hinged end of the rocking shaft 45, whereby to rotate the separating roll 44. The sprocket chain 53 now passes inwardly over another sprocket 56 mounted upon the shaft 42 whereby to rotate the upper feed roll 43. The chain 53 now returns to the sprocket 52, passing over the forward side of the same so as to impart opposite movements to the shafts 39 and 42. At the extreme inner end of the machine the sealing or pressing rolls 57 are located. These rolls 57 are arranged in superposed relation and are mounted upon transverse shafts 58 journaled in the sides 15 and 16 of the frame. The upper roll is journaled in the frame and has no adjustment, while the lower roll has its shaft 58 journaled at its ends in vertically movable blocks 59 mounted in the sides 15 and 16 and yieldingly held upward by springs 60. The springs 60 yieldingly hold the lower compressing roll 57 against the underside of the upper roll 57, thus envelops being sealed may pass freely between the sealing or compressing rolls 57, irrespective of the thickness of the envelops. The shafts 58 are turned in opposite directions by a pair of independent sprocket chains 61 passing over sprockets 62 upon the shafts 58 and over sprockets 63 mounted upon the shafts 51 of the second pair of feed rolls.

The machine of this invention is provided with means for raising the flaps of the envelops and for applying moisture to the flaps to soften the gum thereon and prepare the flaps for sealing. The means for raising the flap from the envelop comprises a pair of warping or twisting rolls 64 mounted upon the shafts 39 and 42. These warping or twisting rolls preferably comprise a pair of flat disks arranged in slightly offset relation upon the shafts 39 and 42 near the side 16 of the frame. The envelops placed upon the table are so disposed that their flap edges are toward the side 16. The twisting rolls 64 engage the adjacent edge of the envelop as it is fed against the rolls and bend or warp the edge downwardly whereby the free edge of the flap rises away from the body of the envelop. The body of the envelop is held from rising with the flap by the first pair of feed rolls 43 engaging the opposite edge of the envelop. The twisting rolls 64 are spaced apart a slight distance so as not to interfere with the action of the rolls 42. However, should it be desired to have the twisting or warping rolls feed the packet through the machine, a structure of twisting roll, such as disclosed in Fig. 11 may be resorted to. In this instance the twisting rolls 64$^a$ are made of rubber or other suitable material for gripping and firmly holding envelops. The rolls 64$^a$ are not spaced apart as in the preferred form, but yieldingly engage one another so as to bind tightly against the opposite sides of the envelop when passed between the rolls. In both instances the twisting rolls 64 and 64$^a$ are provided with oppositely beveled edges, and are placed sufficiently close to one another to effect the bending downwardly of the flap edge of the envelop. In the modified form disclosed in Fig. 11, wherein the twisting rolls 64$^a$ assist in the feeding of the envelop through the machine, the feed rolls 43 are made inoperative for feeding purposes and are utilized simply to hold the outer edge of the envelop down while the inner edge is between the twisting rolls. To effect this result, the lower feed roll 43$^a$ is reduced in diameter so as to provide a relatively wide space between the rolls 43 and 43$^a$. The envelops may pass freely between these rolls and be held in place by a light pressure.

The shaft 39 and the lower shaft 51 of the feed rolls 43 and 50 respectively are journaled in vertically movable blocks 65 mounted in the side 16 of the frame and held upwardly by springs 66 suitably supported upon the side 16 against its inner face. The side 16 is also provided with a straightening device located between the pairs of feed rolls 43 and 50. This straightening device comprises a plate or like member 67 hinged near one end upon the side 16 and having connection at its inner end with one end of a spring 68 carried upon the side 16. The outer end of the plate 67 is provided with a small roller 69 lying substantially in the plane of the lower feed roll 43. This straightening device engages the underside of the envelop as it leaves the twisting rolls for a purpose hereinafter set forth.

The moistening device for the flaps comprises a water trough 70 supported at one end against the side 15 and extending transversely across the machine to a point in proximity to the side 16. The trough 70 is provided in its upper side with a longitudinal slot extending throughout the outer half of its length and receives therein a distributing roller 71 journaled in the end of the trough and in a bearing 72 rising within the trough at its middle portion. The forward edge of the trough is reduced and beveled to provide a separating knife 73 adapted to engage between the flap and the envelop as the same passes from the twisting or flap raising rolls 64. The roller 71 is rotated by the frictional contact of the envelop, against the same under pressure by a peripherally ribbed roller 74 carried immediately above the trough 70. The roller 74 is mounted upon a shaft 75 journaled at its ends in the sides 15 and 16. The shaft 75 is positively rotated by a train of intermeshing gears 76 leading from the upper feed roll shaft 51. Water is fed to the trough 70 from a suitable receptacle 77 through a neck 78. The neck 78 extends from the inner end of the trough longitudinally in the frame against the side 15 of the extreme inner end of the frame. The inner end of the neck 78 is slightly enlarged and rounded and provided with an externally threaded portion projecting through the side 15 and therebeyond. At the inner end of the threaded portion the neck 78 is provided with a collar 79 bearing against the inner face of the side 15 for a purpose hereinafter described. A threaded washer 80 is turned up upon the threaded portion of the neck 78 against the outer face of the side 15, the collar 79 and the washer 80 serving to hold the neck 78 firmly in place. The receptacle 77 is provided with a detachable support 81 in the form of a cap having an elbow connection 82 upon its outer face and adapted for screw threaded engagement upon the threaded end of the neck 78. The elbow connection 82 communicates with the interior of the receptacle 77 and also with the neck 78. A compressible washer 83 is carried between the connection 72 and the washer 80 whereby to seal the connection between the neck and the elbow member 82. In operation the receptacle is adapted to extend upwardly as is disclosed in dotted lines in Fig. 8, whereby the water in the receptacle 77 flows down through the connection 82, the neck 78 and trough 70 to the roller 71. The roller 71, when turned, feeds a thin film of water to the flap of the envelop which passes over the roller and which is pressed thereto by the ribbed roller 74. In this manner the gummed surface of the flap is moistened and the flap is in condition to be sealed to the body of the envelop.

The shaft 45 is provided with a guard plate 84 arranged vertically at the inner end of the envelop receiving table and forwardly of the separating roll 44. The guard plate 84 is supported upon a pair of inwardly extending arms 85 rotatably mounted upon the shaft 45 whereby the guard plate 84 may rise and fall with the shaft 45 and separating roll 44. For the purpose of holding the guard plate 84 in a substantially vertical position at all times, the arm 85 adjacent the side 16 of the frame is provided with an upstanding forked or slotted finger 86 receiving a pin 87 extending inwardly from the side 16. The pin 87 rides in a slot of the finger 76 and holds the finger from lateral movement, but at the same time admits of the vertical movement of the pin and the guard plate.

The operation of the machine is as follows: The envelops, packets, or other wrappers or articles adapted to be sealed, and referred to throughout this specification as "envelops," are placed in superposed position upon the table with the flap edges toward the side 16. In this position the envelops are supported upon the initial feed roll 30 at their middle portions. The bail 23 is preferably swung out upon the pins 24, which supports the outer ends of the envelops. When the motor 18 is set in motion the main feed roll 34 and initial feed roll 30 revolve in a forward direction and carry the lowermost envelop into the machine, the guard plate 84 engaging the inner edges of the envelops and holding the same from engagement with the separating roll 44. Should the envelops be thin and there be a tendency for two or more to pass over the main feed roll 34, the separating roll 43, which by the adjustment of the rest 47, drops down and bears against the upper envelops and forces the same back upon the table. Thus, but one envelop is permitted to pass over the feed roll 34 at a time. The envelop passes from the feed roll 34 over the guide 49 to the first pair of feed rolls 43, the same engaging the outer edge of the envelop and drawing the inner edge of the envelop into contact with the twisting or bending rollers 64. Since the bending rollers 64 are provided with oppositely beveled edges the inner edge of the envelop is bent or twisted down, which action lifts the free end of the flap up from the body of the envelop and holds the flap in such position until the envelop passes from between the twisting rolls. As the envelop passes through the twisting roll 64 the flap is raised and the separating knife 73 lifts the flap up over the trough 70 and the roller 71 while the body of the envelop passes beneath the trough and is straightened out by the small roller 69. The envelop now passes in between the second pair of feed rolls 50, the latter drawing the envelop through the moistening mechanism and receiving it in a straight position with the gummed flap moistened, and passes it to the sealing or compressing rolls 57. The rolls 57 engage the envelop at that portion over which the flap extends, whereby the flap is pressed tightly to the body of the envelop and is thereby sealed to the same. The several shafts are made adjustable as above described for the purpose of receiving envelops containing matter which varies in thickness, thereby producing a thoroughly practical machine capable of operation under many different conditions.

Should the water or other liquid used, feed from the trough 70 too freely over the roller 71, provision is made for checking the flow of the liquid. In Fig. 10 of the drawings the trough 70 has a flexible strip 88 of felt, or the like, therein resting against the forward side of the roller 71. The strip 88 wipes against the roller 71 and insures the taking up of but a thin film of the liquid by the roller. This strip 88 may be fastened in the trough 70 by rivets as shown, or in any other way formed more suitable or desirable.

What I claim is:

1. In a packet sealing machine and in combination, a moistener trough, a roller rising from the trough and adapted to deliver a moistening liquid therefrom, a pair of feed rolls forwardly of the trough for engagement with a packet to move the same beneath the trough, and a second pair of rolls forwardly of the trough arranged in off set and overlapping relation for engagement with the flap edge of the packet to bend said edge down whereby to raise the flap, said overlapping rolls being adapted to deliver the packet with its flap raised to said moistening device.

2. In an envelop sealing machine, the combination with a moistener trough, of a pair of shafts located forwardly of the trough, relatively narrow feeding rolls mounted on the shafts toward one end of the trough for engagement with a packet to move the same toward the trough, a pair of overlapping rolls mounted on said shafts toward the opposite end of the trough for engagement with the flap edge of the packet to bend said edge down and raise the flap, and a separating knife extending forwardly from the trough for engagement beneath said raised flap.

3. In a packet sealing machine, the combination with a moistener trough, of feeding rolls arranged forwardly of the trough adapted to receive a packet and move the same beneath the trough, and means forwardly of said trough for engagement with the flap edge of the packet to bend the same down whereby to raise the flap for passage over said trough.

4. In a packet sealing machine, and in combination, a pair of feeding rolls adapted to engage the bottom edge of the packet, a pair of overlapping rolls adapted to simultaneously engage the flap edge of a packet and bend the flap edge down to raise the flap from the body of the packet, a moistener trough disposed beyond said pairs of rolls and having a forwardly projecting separating knife adapted to engage between the packet and the flap as the packet is fed into the machine whereby the body of the packet passes beneath the moistener trough and the flap moves over the same.

5. In an envelop sealing machine, and in combination, feeding rolls adapted to engage a packet, a pair of overlapping rolls adapted for engagement with the flap edge of a packet to bend said edge and raise the flap from the body of the packet, and a moistening device located in the path of the packet adapted to receive against its lower and upper sides the body of the packet and the flap respectively.

6. In a packet sealing machine, and in combination, feed rolls adapted for the reception of a packet, a pair of overlapping rolls for engagement with the flap edge of the packet to bend said edge down and raise the flap from the body of the packet, a moistener trough located in the path of the packet and adapted to deliver a moistening liquid at the upper face of the trough, and a separating knife extending forwardly from the trough for engagement between the envelop and the flap whereby the body of the envelop is directed beneath the trough and the flap is directed over the trough against the upper face thereof.

7. In a packet sealing machine, and in combination a moistener trough adapted to deliver a moistening liquid at its upper face, a pair of feed rolls adapted to feed a packet to the trough, and bending means for engagement with the flap edge of a packet to bend the same down and raise the flap from the body of the packet and a separating knife located forwardly of the moistening trough and adapted to direct the packet beneath the trough and the flap against the upper face of the trough.

8. In an envelop sealing machine, and in combination, a moistening trough adapted to deliver a moistening liquid at the upper face of the trough, a pair of feed rolls forwardly of the trough adapted to engage and feed an envelop to the trough, and means forwardly of the trough for engagement with the flap edge of the envelop to bend said edge down whereby to raise the flap from the body of the envelop during its passage beneath the trough, and a pressing roller arranged above the trough for engagement with the raised flap whereby to press said flap against the upper face of said trough.

9. In a packet sealing machine, and in combination, a pair of feed rolls adapted to receive a packet, a pair of twisting rolls associated with the feed rolls adapted to bend up the flap of the packet, a moistening device arranged inwardly of the rolls and adapted for engagement between the flap and the packet, a yielding pressure device above the moistening device adapted to engage the flap and press it to the moistening device as the flap moves over the same, and a pair of registering rolls adapted to receive the packet subsequent to its passage from the moistening device and to straighten the packet and press the flap thereto.

10. In an envelop sealing machine, a pair of envelop engaging rolls adapted to feed envelops through the machine, some of said rolls being arranged in overlapping relation whereby to bend the flap edges of the envelops and raise the flaps thereof, and moistening means in the path of the envelop adapted for engagement beneath the flaps as the envelops are fed forwardly by said rolls.

11. In a packet sealing machine, and in combination a moistening device, feeding means adapted to engage a packet and deliver the same to the moistening device, said feeding means including a pair of overlapping rolls adapted to engage the flap edge of the packet and bend the same down whereby to raise the flap from the body of the packet and hold the flap in such position during its passage to the moistening device, means for turning said flap down subsequent to its deliverance from the moistening device, and compressing means associated with said flap turning down means adapted to press said flap to the packet for sealing the same.

12. In a packet sealing machine, two pairs of rolls adapted for engagement with a packet to feed the same through a machine, one pair of said rolls being arranged in slightly offset and overlapping relation and adapted to bend the packet to thereby raise the flap thereof, and moistening means in line with the rolls adapted to engage against the underside of the raised flap.

13. In an envelop sealing machine, and in combination, feeding rolls for an envelop, warping rolls for engagement with the envelop whereby to twist the flap of the envelop into raised position, moistening means disposed inwardly of the rolls adapted to dampen said flap while raised, a roller disposed inwardly of said rolls adapted for engagement with the envelop whereby to straighten out the same, and pressing rollers arranged inwardly of the straightening roller whereby to press said flap to the envelop to seal the same.

14. In an envelop sealing machine, and in combination, envelop feeding means, twisting means for the envelop whereby to lift the flap of the same, a moistening device, and means engaging the flap and adapted to direct the flap against the moistening device to dampen the gum on the flap and to direct the body of the envelop away from the moistening device.

15. In an envelop sealing machine, and in combination, envelop feeding means, bending mechanism associated with the feeding means adapted to bend one edge of the envelop whereby to spring up the flap of the envelop, and a moistening device in line with the feeding means and adapted for engagement with said raised flap.

16. In an envelop sealing machine, a pair of oppositely rotating shafts, a pair of friction rolls arranged intermediate the ends of the shafts and engaging one with the other whereby to grip the bottom edge of an envelop, and a pair of bending rolls mounted on said shafts toward one end of the same and being slightly offset and having oppositely facing beveled edges adapted for engagement with the flap edge of the envelop whereby to twist said edges and raise said flap.

17. In an envelop sealing machine, a pair of oppositely rotating shafts, a pair of feed rolls upon said shafts adapted for engagement with the bottom edge of the envelop, and a pair of overlapping bending rolls mounted on said shafts and adapted for engagement with the flap edge of said envelop whereby to bend said flap up from the body of the envelop.

In testimony whereof I have hereunto set my hand in presence of two subscribing witnesses.

JOHN A. MARKOE.

Witnesses:
F. A. PIKE,
M. J. REEM.

Copies of this patent may be obtained for five cents each, by addressing the "Commissioner of Patents, Washington, D. C."